United States Patent
Jiang et al.

(10) Patent No.: US 11,694,436 B2
(45) Date of Patent: Jul. 4, 2023

(54) VEHICLE RE-IDENTIFICATION METHOD, APPARATUS, DEVICE AND STORAGE MEDIUM

(71) Applicant: BEIJING BAIDU NETCOM SCIENCE TECHNOLOGY CO., LTD., Beijing (CN)

(72) Inventors: Minyue Jiang, Beijing (CN); Xiao Tan, Beijing (CN); Hao Sun, Beijing (CN); Hongwu Zhang, Beijing (CN); Shilei Wen, Beijing (CN); Errui Ding, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 291 days.

(21) Appl. No.: 17/164,681

(22) Filed: Feb. 1, 2021

(65) Prior Publication Data
US 2021/0192214 A1 Jun. 24, 2021

(30) Foreign Application Priority Data
Jun. 30, 2020 (CN) .......................... 202010613125.7

(51) Int. Cl.
*G06T 7/00* (2017.01)
*G06V 20/56* (2022.01)
(Continued)

(52) U.S. Cl.
CPC ............. *G06V 20/20* (2022.01); *G06N 3/045* (2023.01); *G06T 7/97* (2017.01); *G06V 20/176* (2022.01); *G06V 20/56* (2022.01)

(58) Field of Classification Search
None
See application file for complete search history.

(56) References Cited

U.S. PATENT DOCUMENTS

2020/0074205 A1    3/2020   Shuai

FOREIGN PATENT DOCUMENTS

| CN | 107622229 A | 1/2018 |
| CN | 110363193 A | 10/2019 |

(Continued)

OTHER PUBLICATIONS

The ESR of EP application No. 211550413.
(Continued)

*Primary Examiner* — Fan Zhang
(74) *Attorney, Agent, or Firm* — J.C. Patents

(57) ABSTRACT

The present application discloses a vehicle re-identification method and apparatus, a device and a storage medium, which relates to the field of computer vision, intelligent search, deep learning and intelligent transportation. The specific implementation scheme is: receiving a re-identification request from a terminal device, the re-identification request including a first image of a first vehicle shot by a first camera and information of the first camera; acquiring a first feature of the first vehicle and a first head orientation of the first vehicle according to the first image; determining a second image of the first vehicle from images of multiple vehicles according to the first feature, multiple second features extracted based on the images of the multiple vehicles in an image database, the first head orientation of the first vehicle, and the information of the first camera; and transmitting the second image to the terminal device.

17 Claims, 3 Drawing Sheets

(51) Int. Cl.
G06V 20/10 (2022.01)
G06V 20/20 (2022.01)
G06N 3/045 (2023.01)

(56) References Cited

FOREIGN PATENT DOCUMENTS

| | | | | |
|---|---|---|---|---|
| CN | 110458086 | A | * | 11/2019 |
| CN | 110795580 | A | | 2/2020 |
| CN | 111160174 | A | | 5/2020 |
| CN | 111275983 | A | | 6/2020 |
| JP | 2019106193 | A | * | 6/2019 |
| JP | 2019106193 | A | | 6/2019 |
| JP | 2020065200 | A | | 4/2020 |
| WO | WO2019024771 | A1 | | 2/2019 |

OTHER PUBLICATIONS

"City-Scale Multi-Camera Vehicle Tracking by Semantic Attribute Parsing and Cross-Camera Tracklet Matching", 2020 IEEE/CVF Conference on Computer Vision and Pattern Recognition Workshops (CVPRW), IEEE, Jun. 14, 2020, pp. 2456-2465.
"Multi-Camera Tracking of Vehicles based on Deep Features Re-ID and Trajectory-Based Camera Link Models" CVPR Workshop, Jun. 16, 2019, pp. 1-9.
"Novel Traffic Sensing Using Multi-Camera Car Tracking and Re-Identification", Thesis of Yang Hao, Apr. 30, 2020, pp. 1-105.
"VOC-RELD Vehicle Re-identification based on Vehicle-Orientation-Camera", 2020 IEEE/CVF Conference on Computer Vision and Pattern Recognition Workshops (CVPRW), IEEE, Jun. 14, 2020, pp. 2566-2573.
First Office Action of the parallel JP application.
First Office Action of the priority application CN202010613125.7.
"A survey on vehicle re-identification", Chinese Journal of Intelligent Science and Technology, vol. 2, No. 1, Mar. 2020 pp. 10-25.
"Poses Guide Spatiotemporal Model for Vehicle Re-identification", by Xian Zhang, MMM 2019: MultiMedia Modeling, Dec. 11, 2018.

* cited by examiner

VEHICLE RE-IDENTIFICATION METHOD, APPARATUS, DEVICE AND STORAGE MEDIUM

CROSS-REFERENCE TO RELATED APPLICATION

The present application claims priority to Chinese Patent Application No. 202010613125.7, filed on Jun. 30, 2020, which is hereby incorporated by reference in its entirety.

TECHNICAL FIELD

The embodiments of the present application relate to the field of intelligent search in the field of computer technologies, in particular, to a vehicle re-identification method and apparatus, a device, and a storage medium.

BACKGROUND

Vehicle Re-identification (Reid) techniques may be widely applied to the field of vehicle retrieval, vehicle tracking and etc.

A current method of vehicle re-identification is: after receiving a first image of a first vehicle shot by a first camera, a server extracts a first global feature of the first vehicle, compares the first global feature with a second global feature of a vehicle extracted from a second image on the basis of a vehicle image library, and determines an image of the first vehicle from vehicle images included in the vehicle image library. The above method of vehicle re-identification has following problems: if the appearance of two vehicles is very similar, the images of the two vehicles may be misjudged as the image of the same vehicle, that is, the current vehicle re-identification method has a technical issue of low accuracy.

SUMMARY

The present application provides a vehicle re-identification method and apparatus, a device and a storage medium, which improve the accuracy of vehicle re-identification.

In a first aspect, the embodiments of the present application provide a vehicle re-identification method, including: receiving a re-identification request from a terminal device, the re-identification request including a first image of a first vehicle shot by a first camera and information of the first camera; acquiring a first feature of the first vehicle and a first head orientation of the first vehicle according to the first image; determining a second image of the first vehicle from images of multiple vehicles according to the first feature, multiple second features extracted based on the images of the multiple vehicles in an image database, the first head orientation of the first vehicle, and the information of the first camera; and transmitting the second image to the terminal device.

In a second aspect, the embodiments of the present application provide a vehicle re-identification apparatus, including:

a transceiving module, configured to receive a re-identification request from a terminal device, the re-identification request comprising a first image of a first vehicle shot by a first camera and information of the first camera;

a processing module, configured to acquire a first feature of the first vehicle and a first head orientation of the first vehicle according to the first image;

the processing module is configured to determine a second image of the first vehicle from images of multiple vehicles according to the first feature, multiple second features extracted based on the images of the multiple vehicles in an image database, the first head orientation of the first vehicle, and the information of the first camera;

the transceiving module is further configured to transmit the second image to the terminal device.

In a third aspect, the embodiments of the present application provide a vehicle re-identification device, including: at least one processor and a memory;

the memory stores computer-executable instructions; and the at least one processor executes the computer-executable instructions stored in the memory, to cause the at least one processor executes the vehicle re-identification method of the first aspect.

In a fourth aspect, the embodiments of the present application provide a computer-readable memory medium, including: computer-executable instructions, when executed by a processor, cause the vehicle re-identification method of the first aspect to be performed.

The technology according to the present application improves the accuracy of vehicle re-identification.

It should be understood that the content described in this section is not intended to identify the key or important features of the embodiments of the present application, nor is it intended to limit the scope of the present application. Other features of the present application will be easily understood by the following description.

BRIEF DESCRIPTION OF DRAWINGS

The accompanying drawings are used for better understanding the solution and do not constitute a limitation to the present application. Where.

DESCRIPTION OF EMBODIMENTS

Exemplary embodiments of the present application are described below in conjunction with the accompanying drawings, which include various details of the embodiments of the present application to facilitate understanding, and should be regarded as merely exemplary. Therefore, those of ordinary skill in the art should realize that various changes and modifications may be made to the embodiments described herein without departing from the scope and spirit of the present application. Likewise, for clarity and conciseness, descriptions of well-known functions and structures are omitted in the following description.

In order to better understand the present application, the present application introduces the following elements:

if after an image of a vehicle is shot by a camera A, the next camera shooting an image of the vehicle is a camera B, then the camera A and the camera B are adjacent. Or, after an image of a vehicle is shot by a camera B, the next camera shooting an image of the vehicle is a camera A, then the camera A and the camera B are adjacent.

The embodiments of the present application relate to the fields of computer vision, intelligent search, deep learning, and intelligent transportation in the field of computer technologies to achieve the technical effect of improving the accuracy of vehicle re-identification.

A current method of vehicle re-identification is: after receiving a first image of a first vehicle shot by a first camera, a server extracts a first global feature of the first vehicle, compares the first global feature with a second global feature of a vehicle extracted from a second image on the basis of a vehicle image library, and determines an image of the first vehicle from vehicle images included in the vehicle image library. The above method of vehicle re-identification has following problems: if the appearance of two vehicles is very similar, the images of the two vehicles may be misjudged as the image of the same vehicle, that is, the current vehicle re-identification method has a technical issue of low accuracy.

In order to solve the technical problem, the present application introduces information of a camera and a head orientation of a vehicle in an image taken by a camera to improve the accuracy of vehicle re-identification.

Figure 1:
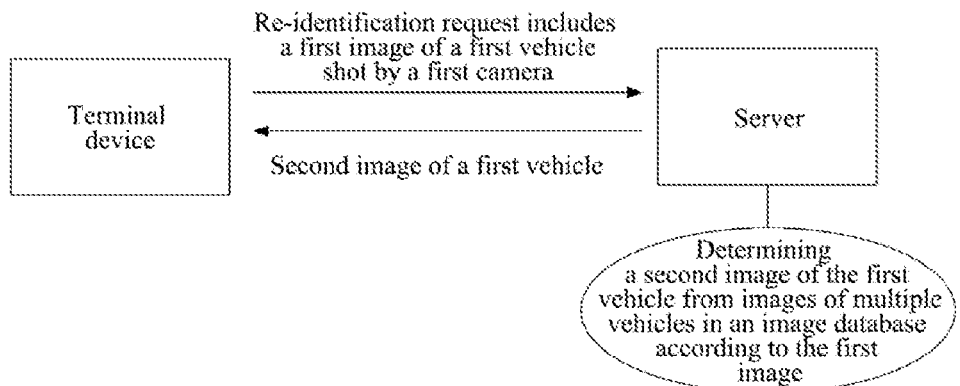
FIG. 1 is a system architecture diagram provided by an embodiment of the present application.

FIG. 1 is a schematic diagram of a system architecture provided by an embodiment of the present application. Referring to FIG. 1, the system architecture includes a server and a terminal device.

The terminal device transmits a re-identification request to the server. The re-identification request includes a first image of a first vehicle shot by a first camera, and information of the first camera; the server acquires a first feature of the first vehicle and a first head orientation of the first vehicle according to the first image; determines a second image of the first vehicle from images of multiple vehicles according to the first feature, multiple second features extracted from the images of the multiple vehicles in an image database, the first head orientation, and the information of the first camera. The server transmits the second image to the terminal device. It is understandable that the server may also transmits a shooting time of the second image, information of a camera that took the second image, and the like to the terminal device.

The following describes the vehicle re-identification method of the present application with reference to specific embodiments.

Figure 2:
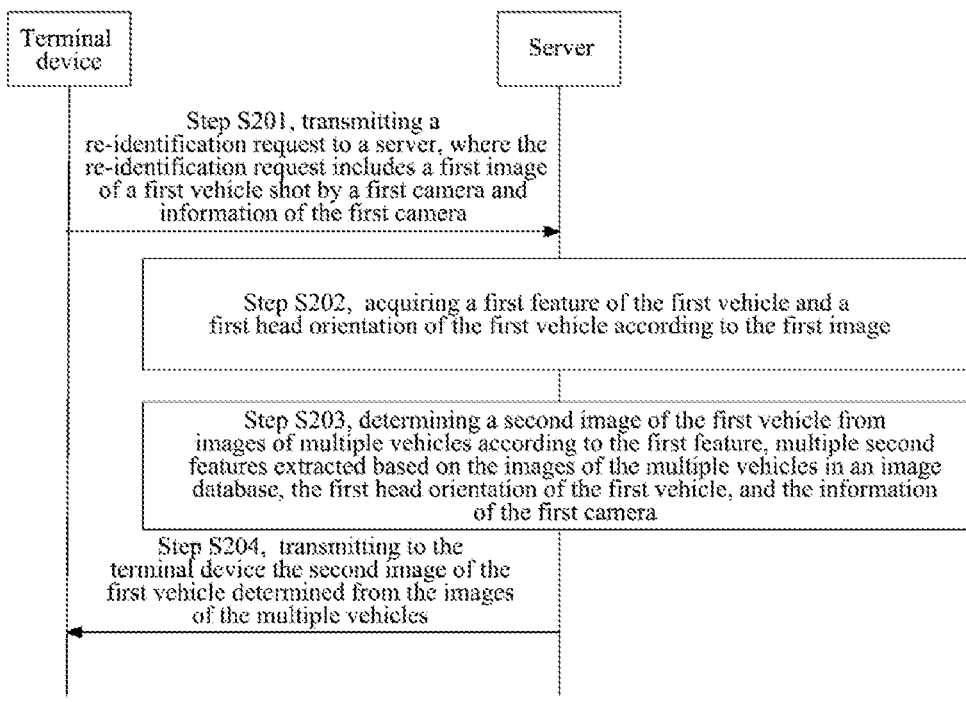
FIG. 2 is a flowchart of a vehicle re-identification method provided by an embodiment of the present application.

FIG. 2 is a first flowchart of a vehicle re-identification method provided by an embodiment of the present application. Referring to FIG. 2, the method of the embodiment includes:

Step S201, a terminal device transmits a re-identification request to a server, where the re-identification request includes a first image of a first vehicle shot by a first camera and information of the first camera.

It is understandable that after a camera takes an image, the image, a time when the image was taken, and information of the camera are stored in an associated manner. Where the information of the camera includes a geographic location of the camera and a lens orientation of the camera.

That is, the first image of the first vehicle is stored in association with a shooting time of the first image and the information of the first camera. Therefore, the re-identification request may also include the shooting time of the first image.

Optionally, the re-identification request may also include a preset time period.

The method for acquiring at least one frame of first image of the first vehicle may be as follows: the server acquires at least one frame of image shot by the first camera in a first time period; detects the first vehicle from the at least one frame of image by using a target detection method, to obtain at least one frame of first image of the first vehicle. It is understandable that the shooting time of the first image belongs to (falls into) the first time period.

Step S202, the server acquires a first feature of the first vehicle and a first head orientation of the first vehicle according to the first image.

In this step, the first image used by the server may be all the first images included in the re-identification request, or may be remaining first images after removing the first images whose resolutions are smaller than the preset resolution.

Since the first feature of the first vehicle is obtained based on the first image, therefore, the first feature of the first vehicle is at least similar to the appearance of the vehicle, such as a global feature of the vehicle. Therefore, in one solution, the first feature of the first vehicle is the global feature of the first vehicle. In another solution, the first feature of the first vehicle is a feature after fusion of a global sub-feature and a feature point sub-feature of the first vehicle. Where N feature points may be defined, and the feature point sub-feature of the first vehicle includes features of at least part of the feature points of the N feature points of the first vehicle. Where the global feature of the vehicle may include at least one of contour information of the vehicle, color information of the vehicle, and model information of the vehicle.

Figure 3:
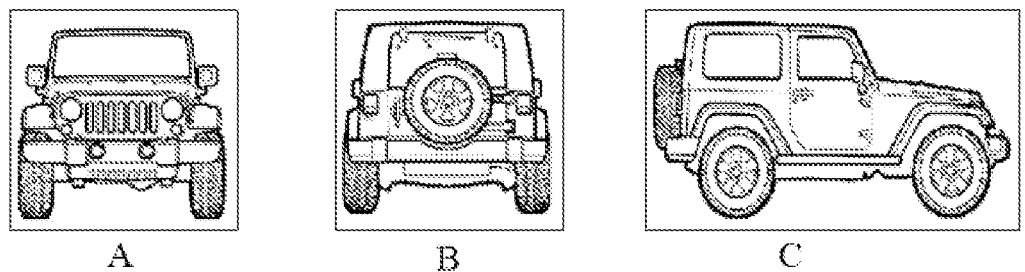
FIG. 3 is a schematic diagram of a head orientation of a vehicle in an image provided by an embodiment of the present application.

The head orientation of the first vehicle in the embodiment is acquired according to the head orientation of the first vehicle in the first image. For example, a head orientation of a vehicle in FIG. 3A is downward, a head orientation of a vehicle in FIG. 3B is downward, and a head orientation of a vehicle in FIG. 3C is rightward.

It may be understood that a head orientation of a vehicle in an image is related to a lens orientation of a camera that took the image and a current driving posture of the vehicle. For example, if the driving posture of the vehicle makes the lens orientation of the camera opposite to the head of the vehicle, the image shot is as shown in FIG. 3A, and the head orientation of the vehicle is downward. If the driving posture of the vehicle makes the lens orientation of the camera on the left side of the vehicle, the image shot is as shown in FIG. 3C, the head orientation of the vehicle is rightward. If the driving posture of the vehicle makes the lens orientation of the camera opposite to the trail of the vehicle, the image shot is as shown in FIG. 3B, and the head orientation of the vehicle is upward.

Step S203, the server determines a second image of the first vehicle from images of multiple vehicles according to the first feature, multiple second features extracted based on the images of the multiple vehicles in an image database, the first head orientation of the first vehicle, and the information of the first camera.

It may be understood that when the re-identification request includes a preset time period, the images of the multiple vehicles are images of the vehicles taken by cameras in a preset area within the preset time period.

The multiple vehicles in the embodiment and multiple second features have a one-to-one correspondence. It may be understood that when a first feature of a first vehicle is a global feature of the first vehicle, a second feature is also a global feature of the vehicle; when the first feature of the first vehicle is a feature after fusion of a global sub-feature and a feature point sub-feature of the first vehicle, the second feature is also a feature after fusion of a global sub-feature and a feature point sub-feature of a corresponding vehicle. And the method for acquiring the first feature is as same as the method for acquiring the second feature.

It may be understood that, for any vehicle corresponding to an image in an image database, the camera may capture at least one frame of image of the vehicle, from the time when the vehicle appears in a shooting range of the camera to the time when the vehicle disappears from the shooting range of the camera. The second feature of the vehicle may be acquired based on the at least one frame of image of the vehicle.

The vehicle re-identification method in the embodiment considers not only a feature of a vehicle, but also a head orientation of the vehicle in an image and information of a camera that shot the image, a predicted head orientation of the vehicle in an image of the vehicle shot by an adjacent camera may be predicted according to the head orientation of the vehicle in the image and the information of the camera that shot the image, so that images shot by the adjacent cameras with similar features but with head orientations different from the predicted head orientation may be filtered out. Therefore, the method of the embodiment may reduce the probability of recognizing the image of a vehicle similar in appearance to the vehicle to be re-identified as the vehicle to be re-identified, and improve the accuracy of vehicle re-identification. For example, a vehicle to be re-identified is a vehicle a, and features of a vehicle b are very similar to those of vehicle a, a head orientation of the vehicle b is a first orientation, and a head orientation of the vehicle a when passing by a camera b is predicted as a second orientation according to a lens orientation of the camera b that shoots the vehicle b, so it may be determined that the vehicle b and the vehicle a are not the same vehicle, that is, the image of the vehicle b will not be determined as the image of the vehicle a shot by the camera b.

Step S204, the server transmits to the terminal device the second image of the first vehicle determined from the images of the multiple vehicles.

It is understandable that the second image is stored in association with a shooting time of the second image and information of the camera that shot the second image. Therefore, the server may also transmit to the terminal device the shooting time of the second image and the information of the camera that shot the second image.

The vehicle re-identification method in the embodiment considers not only a feature of a vehicle, but also a head orientation of the vehicle in an image and information of a corresponding camera, so it may reduce the probability of recognizing the image of the vehicle similar in appearance to the vehicle to be re-identified as the vehicle to be re-identified, and improve the accuracy of vehicle re-identification.

The implementation shown in FIG. 2 will be described in detail below with reference to several specific embodiments.

First, specific embodiments are used for describing the step of acquiring a first feature of a first image according to the first image.

In a manner, a first feature of a first vehicle includes a global feature of the first vehicle. Accordingly, the acquiring the first feature of the first vehicle according to the first image includes: acquiring, based on the first image, the global feature of the first vehicle by adopting a second neural network model. Where the second neural network model is a pre-trained neural network model for extracting a global feature of a vehicle.

It can be understood that the first image has at least one frame. In a specific implementation, based on the at least one frame of first image, the acquiring the global feature of the first vehicle includes the following a1-a2:

a1. For each frame of first image: acquiring, based on the first image, the global feature of the first vehicle, which corresponds to the first image, by adopting the second neural network model.

That is, an input vector of the second neural network model may be obtained based on the first image, the input vector is input to the second neural network model, and after calculating by an algorithm corresponding to the second neural network model, an output vector of the second neural network model is obtained, the output vector is thus the global feature of the first vehicle corresponding to the first image.

a2. When the number of frames of the first image is multiple, acquiring the global feature of the first vehicle according to the global features of the first vehicle corresponding to respective first images.

In a specific implementation, the acquiring the global feature of the first vehicle according to the global features of the first vehicle corresponding to the respective first images includes: averaging output vectors obtained by adopting the second neural network model and based on each first image, the obtained vector is thus the global feature of the first vehicle. Where the meaning of averaging multiple vectors is: adding components at the same positions of respective vectors and then taking the average value.

This manner is more efficient for acquiring the first feature of the first vehicle.

In another manner, accordingly, the acquiring the first feature of the first vehicle according to the first image includes the following b1-b2:

b1. Acquiring, based on the first image, a global sub-feature of the first vehicle by adopting the second neural network model.

For the specific implementation of this step, please refer to the above a1-a2, which will not be repeated here.

b2. Acquiring, based on the first image, a feature point sub-feature of the first vehicle by adopting a third neural network model.

In a specific implementation, the acquiring, based on the first image, a feature point sub-feature of the first vehicle by adopting a third neural network model includes b21-b23:

b21. For each frame of first image: inputting the first image into a pre-trained feature point extracting model, and acquiring feature point information of the first vehicle corresponding to the first image according to an output result of the feature point extracting model, where the feature point information includes a feature point of the first vehicle and an identification of the feature point.

Where the feature point extracting model may be acquired by pre-training in the following way: acquiring training data, the acquired training data containing respective training vehicle images and feature point information of the vehicles in the respective training vehicle images, where the feature point information contains respective feature points of the training vehicle and identification information of the respective feature points. In the training process, the neural network is trained by taking the vector acquired from the training vehicle image as an input and by taking the feature point information of the training vehicle in the training vehicle image as a desired output, thereby acquiring the feature point extracting model.

b22. Selecting same target feature points included in the feature point information of the first vehicle corresponding to respective first images. For each frame of the first image, according to the target feature points, acquiring a feature point sub-feature of the first vehicle corresponding to the first image.

This step may be implemented in the following way: for each frame of first image, according to the respective determined target feature points, the largest rectangular area that contains only one single target feature point acquired from the first image is used as a local block corresponding to each of the target feature points, for example, taking a position of the target feature point as the center, acquiring the largest rectangular area in the image of the vehicle that only contains said feature point and contains no other feature points; after adjusting the local blocks corresponding to the respective target feature points to a uniform size, splicing the local blocks corresponding to the respective target feature points; performing feature extraction on the splicing result, and taking the extracted feature as the feature point sub-feature of the first vehicle corresponding to the first image. In this step, a feature extracting model obtained by pre-training may be used for extracting a feature of the splicing result. It is understandable that in this step, instead of acquiring the local blocks corresponding to the respective target feature points, the target feature points of the first vehicle may be directly spliced in sequence, so that the feature extracted from the splicing result is regarded as the feature point sub-feature of the first vehicle corresponding to said first image.

b23. Acquiring the feature point sub-feature of the first vehicle according to the feature point sub-features of the first vehicle corresponding to the respective first images.

It may be understood that the feature point sub-feature of the first vehicle corresponding to the first image is a feature vector, and the feature point sub-feature of the first vehicle is obtained by averaging respective feature vectors.

b3. Fusing the global sub-feature of the first vehicle and the feature point sub-feature of the first vehicle to acquire the first feature of the first vehicle.

The first feature of the first vehicle acquired in this way is more comprehensive, which improves the accuracy of vehicle re-identification.

This embodiment describes the specific implementation of acquiring the first feature of the first vehicle based on the first image.

Secondly, the specific implementation of the "acquiring a first head orientation of the first vehicle according to the first image" will be described by a specific embodiment.

In a manner: the acquiring the first head orientation of the first vehicle according to the first image includes the following d1-d2:

d1. For each frame of first image, acquiring a head orientation of the first vehicle in the first image according to the first image.

Based on the first image, acquiring the head orientation of the first vehicle in the first image by adopting a first neural network model. In a specific implementation: acquiring, based on the first image, a head orientation label of the first vehicle in the first image by adopting a first neural network model, the head orientation label is used for indicating probabilities of the head orientations of the first vehicle in the first image being respective preset head orientations; determining the head orientation of the first vehicle in the first image from the respective preset head orientations according to the head orientation label.

The preset head orientation may include such eight directions: up, down, left, right, down right, up right, down left, and up left. The head orientation label may be (x1, x2, x3, x4, x5, x6, x7, x8), x1-x8 may respectively indicate the probability of the head orientation being up, down, left, right, down right, up right, down left, and up left.

For example, acquiring, based on the first image, a head orientation label as (0.1, 0.05, 0.7, 0.05, 0, 0, 0.1, 0) by adopting the first neural network model, then the head orientation of the first vehicle in the first image is left.

d2. Acquiring a first head orientation of the first vehicle according to the head orientation of the first vehicle in the first image.

The head orientations of the first vehicle in respective first images may include multiple head orientations, and each head orientation corresponds to at least one frame of first image, where an image corresponding to a head orientation means that a head orientation of the vehicle in this image is this head orientation. At this time, the first head orientation of the first vehicle is a first type head orientation in multiple head orientations, and the first type head orientation corresponds to the largest number of first images. Exceptionally, if the numbers of the first images corresponding to respective head orientations of the multiple head orientations are the same, determining the first head orientation of the first vehicle as a head orientation of the first vehicle in a first image with the latest shooting time or a head orientation randomly selected from the multiple head orientations. If there are at least two head orientations corresponding to the largest number of the first images among the multiple head orientations, one head orientation is randomly selected from the at least two head orientations as the first head orientation of the first vehicle.

In this manner, the accuracy of acquiring the first head orientation of the first vehicle is relatively high.

In another manner: the acquiring the first head orientation of the first vehicle according to the first image includes: acquiring a head orientation of the first vehicle in a first image with the latest shooting time, and determining the head orientation as the first head orientation of the first vehicle.

This method is more efficient for acquiring the first head orientation of the first vehicle.

This embodiment describes the specific implementation of the step of acquiring the first head orientation of the first vehicle according to the first image.

Next, the "the server determines a second image of the first vehicle from images of multiple vehicles according to the first feature, multiple second features extracted based on the images of the multiple vehicles in an image database, the first head orientation of the first vehicle, and the information of the first camera" will be described by a specific embodiment.

In a solution, the "the server determines a second image of the first vehicle from images of multiple vehicles according to the first feature, multiple second features extracted based on the images of the multiple vehicles in an image database, the first head orientation of the first vehicle, and the information of the first camera" includes the following e1-e2:

e1. Determining images of pre-selected vehicles from the images of the multiple vehicles according to the first feature of the first vehicle and the multiple second features extracted based on the images of the multiple vehicles in an image database; where a similarity between a second feature extracted based on an image of a pre-selected vehicle and the first feature is greater than or equal to a preset similarity.

For the algorithm for obtaining the similarity between features of the vehicle, reference may be made to a current general algorithm, which will not be repeated here.

e2. Determining the second image of the first vehicle from the images of the pre-selected vehicles according to head orientations of the pre-selected vehicles, the first head orientation of the first vehicle, the information of the first camera, and information of a camera for shooting the images of the pre-selected vehicles.

Where a method for acquiring the head orientation of the pre-selected vehicle is as same as the method for acquiring the first head orientation of the first vehicle. That is, the head orientation of the pre-selected vehicle is obtained based on the image of the pre-selected vehicle.

In a specific implementation: for images of pre-selected vehicles with target shooting times later than a target shooting time of the first image, the determining the second image of the first vehicle from the images of the pre-selected vehicles includes e21-e23:

e21. Performing a first operation, where the first operation includes: determining whether an i-th reference vehicle will appear in an i-th pre-selected camera for shooting an image of an i-th pre-selected vehicle, according to a head orientation of the i-th reference vehicle, information of an i-th reference camera, and information of the i-th pre-selected camera; if yes, acquiring an i-th predicted head orientation of the i-th reference vehicle when appearing in the i-th pre-selected camera, if the i-th predicted head orientation is as same as a head orientation of the i-th pre-selected vehicle, determining the image of the i-th pre-selected vehicle as the second image of the first vehicle; initially, when i=1, a first reference vehicle is the first vehicle, a first reference camera is the first camera, a target shooting time of the image of the i-th reference vehicle is earlier than a target shooting time of the image of the i-th pre-selected vehicle and has the shortest distance from the target shooting time of the image of the i-th pre-selected vehicle.

In this embodiment, if the camera captures multiple frames of image of a vehicle A in a certain time period, a shooting time of the first frame of image of the vehicle A shot in the time period is defined as a target shooting time of the image of the vehicle A, or a shooting time of the last frame of the image of the vehicle A shot in the time period is defined as the target shooting time of the image of the vehicle A. The target shooting time of the image of the vehicle A may also be defined in other ways, which is not limited in this embodiment.

The i-th pre-selected camera may correspond to one or more images of the i-th pre-selected vehicle in the same time period. If it corresponds to multiple images of the i-th pre-selected vehicle, the target shooting times of the multiple images of the i-th pre-selected vehicles are the same. At this time, it is necessary to perform the operation described in e21 on each of the images of the i-th pre-selected vehicle. Those skilled in the art should understand that there exists an image among the multiple images of the i-th pre-selected vehicle that is not the image of the first vehicle.

It is understandable that during normal driving, the i-th reference camera is adjacent to the i-th pre-selected camera, and the i-th pre-selected camera is adjacent to an (i+1)-th pre-selected camera.

Where the determining whether an i-th reference vehicle will appear in an i-th pre-selected camera for shooting an image of an i-th pre-selected vehicle may include: determining a possible driving direction of the i-th reference vehicle on the road where the i-th reference camera is located, based on a head orientation of the i-th reference vehicle, a lens orientation of the i-th reference camera, and a geographical position of the i-th reference camera; and determining whether the i-th reference vehicle will appear in the i-th pre-selected camera, based on a geographical position of the i-th pre-selected camera and the possible driving direction of the i-th reference vehicle.

e22. Performing a second operation, where the second operation includes: if there is an image of a pre-selected vehicle with a target shooting time later than the target shooting time of the first image and not traversed, then increasing i by 1, and if the image of the i-th pre-selected vehicle is determined to be the second image, taking the i-th pre-selected vehicle as an (i+1)-th reference vehicle, otherwise taking the i-th reference vehicle as the (i+1)-th reference vehicle.

e23. Repeating the first operation and the second operation until all the images of the pre-selected vehicles with the target shooting times later than the target shooting time of the first image are traversed.

For images of pre-selected vehicles with target shooting times earlier than a target shooting time of the first image, the determining the second image of the first vehicle from the images of the pre-selected vehicles includes e24-e26:

e24. Performing a third operation, where the third operation includes: determining whether a j-th reference vehicle will appear in a j-th pre-selected camera for shooting an image of a j-th pre-selected vehicle, according to a head orientation of the j-th reference vehicle, information of a j-th reference camera, and information of the j-th pre-selected camera; if yes, acquiring a j-th predicted head orientation of the j-th reference vehicle when appearing in the i-th pre-selected camera, if the j-th predicted head orientation is as same as a head orientation of the j-th pre-selected vehicle, determining the image of the j-th pre-selected vehicle as the second image of the first vehicle; initially, when j=1, a first reference vehicle is the first vehicle, a first reference camera is the first camera, a target shooting time of the image of the j-th reference vehicle is later than a target shooting time of the image of the j-th pre-selected vehicle and has the shortest distance from the target shooting time of the image of the j-th pre-selected vehicle.

Where the determining whether a j-th reference vehicle will appear in a j-th pre-selected camera for shooting an image of a j-th pre-selected vehicle may include: determining a possible driving direction towards which the j-th reference vehicle can travel to reach a position where the j-th reference camera is located, based on a head orientation of the j-th reference vehicle, a lens orientation of the j-th reference camera, and a geographical position of the j-th reference camera; and determining whether the j-th reference vehicle will appear in the j-th pre-selected camera, based on a geographical position of the j-th pre-selected camera and the possible driving direction of the j-th reference vehicle.

The j-th pre-selected camera may correspond to one or more images of the j-th pre-selected vehicle in the same time period. If it corresponds to multiple images of the j-th pre-selected vehicle, the target shooting times of the multiple images of the j-th pre-selected vehicles are the same. At this time, it is necessary to perform the operation described in e24 on each of the images of the j-th pre-selected vehicle. Those skilled in the art should understand that there exists an image among the multiple images of the j-th pre-selected vehicle that is not the image of the first vehicle.

It is understandable that during normal driving, the j-th reference camera is adjacent to the j-th pre-selected camera, and the j-th pre-selected camera is adjacent to a (j+1)-th pre-selected camera.

e25. Performing a fourth operation, where the fourth operation includes: if there is an image of a pre-selected vehicle with a target shooting time earlier than the target shooting time of the first image and not traversed, then increasing j by 1, and if an image of the j-th pre-selected vehicle is determined to be the second image, taking the j-th pre-selected vehicle as a (j+1)-th reference vehicle, otherwise taking the j-th reference vehicle as a (j+1)-th reference vehicle.

e26. Repeating the third operation and the fourth operation until all the images of the pre-selected vehicles with target shooting times earlier than the target shooting time of the first image are traversed.

Illustratively, images of respective pre-selected vehicles include an image 1 of a pre-selected vehicle 1, an image 2 and an image 3 of a pre-selected vehicle 2, an image 4 of a pre-selected vehicle 3, an image 5, an image 6 and an image 7 of a pre-selected vehicle 4, the image 1 is an image taken by a pre-selected camera 1, the image 2 and the image 3 are images taken by a pre-selected camera 2, the image 4 is an image taken by a pre-selected camera 3, and the image 5, the image 6, and the image 7 are images taken by a pre-selected camera 4. Where a target shooting time of the image 1 is earlier than a target shooting time of the first image, and shooting times corresponding to the images 2 to 7 are later than the target shooting time of the first image. The target shooting time of the image 1 of the pre-selected vehicle 1 is earlier than the target shooting time of the first image of the first vehicle, the target shooting time of the first image of the first vehicle is earlier than a target shooting time of the images of the pre-selected vehicle 2, the target shooting time of the images of the pre-selected vehicle 2 is earlier than a target shooting time of the image of the pre-selected vehicle 3, and the target shooting time of the image of the pre-selected vehicle 3 is earlier than a target shooting time of the images of the pre-selected vehicle 4.

Figure 4:
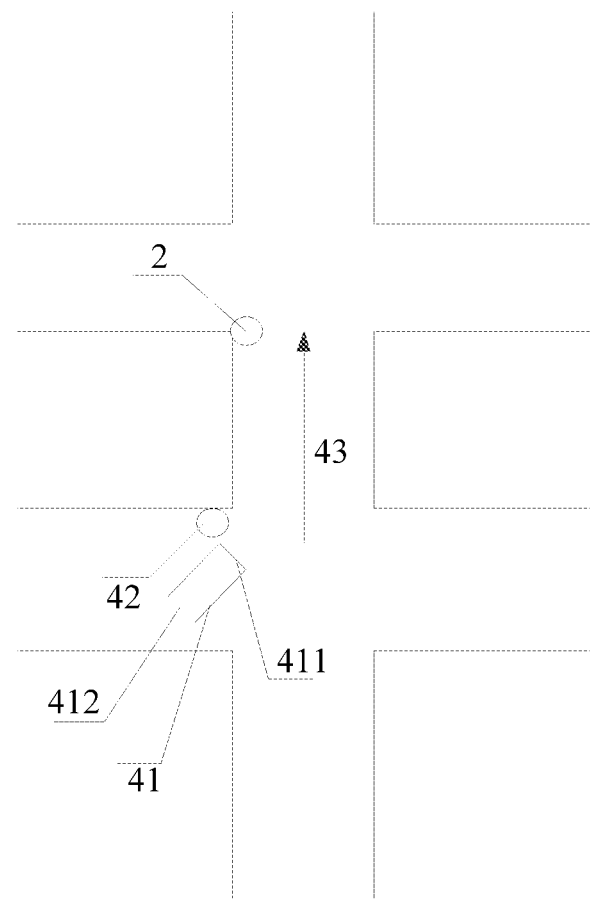
FIG. 4 is a first schematic diagram of vehicle re-identification based on a head orientation of a vehicle and information of a camera provided by an embodiment of the present application.

Determining whether the first vehicle will appear in the pre-selected camera 2 for shooting the images of the pre-selected vehicle 2, according to the first head orientation of the first vehicle, the geographic location of the first camera, the lens orientation of the first camera, and the geographic location of the pre-selected camera 2. The specific determination method may be: determining a possible driving direction of the first vehicle based on the first head orientation of the first vehicle, the lens orientation of the first camera, and the geographic location of the first camera. Next, determining whether the first vehicle will appear in the pre-selected camera 2 based on a geographic location of the pre-selected camera 2 and the possible driving direction of the first vehicle. Specifically, as shown in FIG. 4, determining a driving state of the first vehicle based on a first head orientation of a first vehicle 41, a lens orientation of a first camera 42, and a geographic location of the first camera. The driving state includes a driving position range and a vehicle posture. For example, FIG. 4 shows possible positions of the first vehicle and a posture of the first vehicle, the posture of the vehicle includes: 411 is a head of the first vehicle, and 412 is a trail of the first vehicle. According to the driving state, it is determined that the possible driving direction of the first vehicle 41 is a direction 43. If it is determined that the geographic location of the pre-selected camera 2 is a geographic location of a camera that may be reached by the first vehicle traveling in the direction 43, determining that the first vehicle will appear in the pre-selected camera 2.

If it is determined that the first vehicle will appear in the pre-selected camera 2, predicting, according to the possible driving direction of the first vehicle and the lens orientation of the pre-selected camera 2, a head orientation of the first vehicle in an image of the first vehicle shot by the pre-selected camera 2, that is, acquiring a predicted head orientation of the first vehicle when appearing in the pre-selected camera 2. If the predicted head orientation is as same as the head orientation of the pre-selected vehicle 2, determining that the image 2 and the image 3 of the pre-selected vehicle 2 are the second image of the first vehicle. It is understandable that the head orientation of the pre-selected vehicle 2 is obtained based on the image 2 and the image 3 and by adopting the first neural network model.

Next, determining whether the pre-selected vehicle 2 will appear in the pre-selected camera 3, according to the head orientation of the pre-selected vehicle 2, the geographic location of the pre-selected camera 2, the lens orientation of the pre-selected camera 2, and a geographic location of the pre-selected camera 3. The specific determination method may be: determining a possible driving direction of the pre-selected vehicle 2 based on the head orientation of the pre-selected vehicle 2, the lens orientation of the pre-selected camera 2, and the geographic location of the pre-selected camera 2. Next, determining whether the pre-selected vehicle 2 will appear in the pre-selected camera 3 based on the geographic location of the pre-selected camera 3 and the possible driving direction of the pre-selected vehicle 2. If it is determined that the pre-selected vehicle 2 will appear in the pre-selected camera 3, predicting, according to the possible driving direction of the pre-selected vehicle 2 and the lens orientation of the pre-selected camera 2, a head orientation of the pre-selected vehicle 2 in an image of the pre-selected vehicle 2 shot by the pre-selected camera 3, that is, acquiring a predicted head orientation of the pre-selected vehicle 2 when appearing in the pre-selected camera 3. If the predicted head orientation is as same as the head orientation of the pre-selected vehicle 3, determining that the image 4 of the pre-selected vehicle 3 is the second image of the first vehicle.

Continuing to determine whether the pre-selected vehicle 3 will appear in the pre-selected camera 4 according to the head orientation of the pre-selected vehicle 3, the geographic location of the pre-selected camera 3, the lens orientation of the pre-selected camera 3, and a geographic location of the pre-selected camera 4. If it is determined that the pre-selected vehicle 3 will appear in the pre-selected camera 4, predicting, according to the possible driving direction of the pre-selected vehicle 3 and the lens orientation of the pre-selected camera 4, a head orientation of the pre-selected vehicle 3 in an image of the pre-selected vehicle 3 shot by the pre-selected camera 4, that is, acquiring a predicted head orientation of the pre-selected vehicle 3 when appearing in the pre-selected camera 4. If the predicted head orientation is not as same as the head orientation of the pre-selected vehicle 4, determining that the images 5-7 of the pre-selected vehicle 4 are not the second image of the first vehicle.

Figure 5:
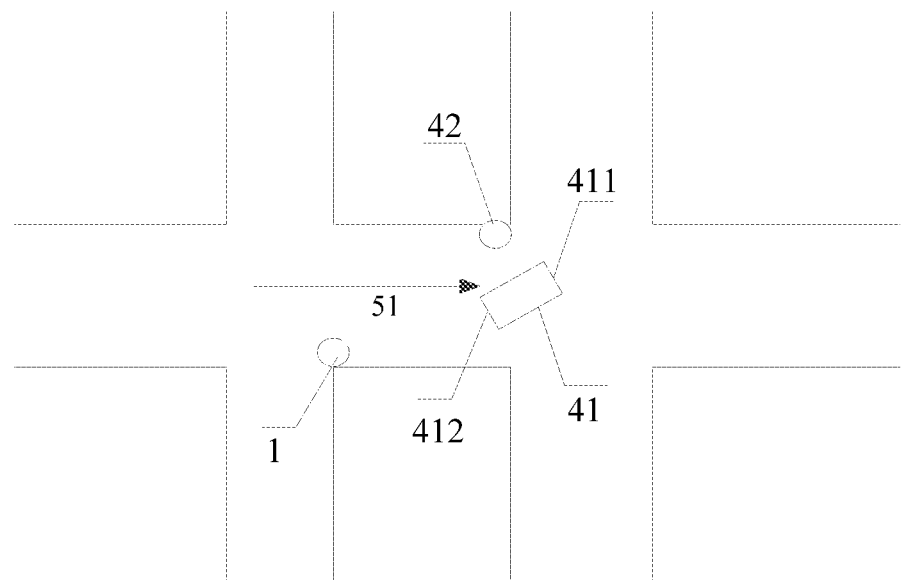
FIG. 5 is a second schematic diagram of vehicle re-identification based on a head orientation of a vehicle and information of a camera provided by an embodiment of the present application.

Finally, determining whether the first vehicle will appear in the pre-selected camera 1 for shooting an image of the pre-selected vehicle 1 according to the first head orientation of the first vehicle, the geographic location of the first camera, the lens orientation of the first camera, and the geographic location of the pre-selected camera 1. The specific determination method may be: determining a possible driving direction towards which the first vehicle can travel to reach a position where the first camera is located, based on the first head orientation of the first vehicle and the lens orientation of the first camera. Next, determining whether the first camera will appear in the pre-selected camera 1 based on a geographic location of the pre-selected camera 1 and the possible driving direction towards which the first vehicle can travel to reach a position where the first camera is located. Specifically, as shown in FIG. 5, determining a driving state of the first vehicle based on a first head orientation of a first vehicle 41, a lens orientation of a first camera 42, and a geographic location of the first camera. The driving state includes a driving position range and a vehicle posture. For example, FIG. 5 shows the position and the posture of the first vehicle, the posture of the vehicle includes: 411 is a head of the first vehicle, and 412 is a trail of the first vehicle. According to the driving state, it is determined that the driving direction towards which the first vehicle can travel to reach a position where the first camera is located is 51. If it is determined that the geographic location of the pre-selected camera 1 may be reached by the first vehicle traveling in the direction 51 from the pre-selected camera 1, determining that the first vehicle will appear in the pre-selected camera 1.

If it is determined that the first vehicle will appear in the pre-selected camera 1, predicting, according to the driving direction towards which the first vehicle can travel to reach a position where the first camera is located, and the lens orientation of the pre-selected camera 1, a head orientation of the first vehicle in an image of the first vehicle shot by the pre-selected camera 1, that is, acquiring a predicted head orientation of the first vehicle when appearing in the pre-selected camera 1. If the predicted head orientation is as same as the head orientation of the pre-selected vehicle 1, determining that the image 1 of the pre-selected vehicle 1 is the second image of the first vehicle. It may be understood that if the image 1 of the pre-selected vehicle 1 is the second image of the first vehicle, the first vehicle first appears in the field of view of the pre-selected camera 1 and then appears in the field of view of the first camera.

This embodiment provides a specific implementation of the "the server determines a second image of the first vehicle from images of multiple vehicles according to the first feature, multiple second features extracted based on the images of the multiple vehicles in an image database, the first head orientation of the first vehicle, and the information of the first camera".

The methods involved in the present application have been described above, and specific embodiments are used for describing the devices involved in the present application.

Figure 6:
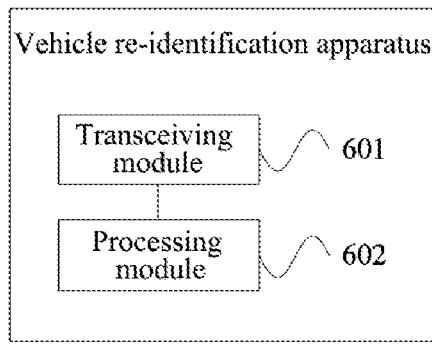
FIG. 6 is a schematic structural diagram of an vehicle re-identification apparatus provided by an embodiment of the present application.

FIG. 6 is a schematic structural diagram of a vehicle re-identification apparatus provided by an embodiment of the present application. Referring to FIG. 6, the device of the embodiment may include a transceiving module 601 and a processing module 602.

The transceiving module 601 is configured to receive a re-identification request from a terminal device, the re-identification request includes a first image of a first vehicle shot by a first camera and information of the first camera; the processing module 602 is configured to acquire a first feature of the first vehicle and a first head orientation of the first vehicle according to the first image; the processing module 602 is configured to determine a second image of the first vehicle from images of multiple vehicles according to the first feature, multiple second features extracted based on the images of the multiple vehicles in an image database, the first head orientation of the first vehicle, and the information of the first camera; the transceiving module 601 is further configured to transmit the second image to the terminal device.

Optionally, where the re-identification request includes multiple frames of first images of the first vehicle shot by the first camera; the processing module 602 is specifically configured to: for each frame of first image, acquire a head orientation of the first vehicle in the first image according to the first image, and acquire the first head orientation of the first vehicle according to the head orientations of the first vehicle in respective first images.

Optionally, where the processing module 602 is specifically configured to acquire, based on the first image, the head orientation of the first vehicle in the first image by adopting a first neural network model.

Optionally, the processing module 602 is specifically configured to determine images of pre-selected vehicles from the images of the multiple vehicles according to the first feature, the multiple second features extracted based on the images of the multiple vehicles; where a similarity between a second feature extracted based on an image of a pre-selected vehicle and the first feature is greater than or equal to a preset similarity; and determine the second image of the first vehicle from the images of the pre-selected vehicles according to head orientations of the pre-selected vehicles, the first head orientation of the first vehicle, the information of the first camera, and information of a camera for shooting the images of the pre-selected vehicles.

Optionally, the re-identification request further includes a shooting time of the first image, and the processing module 602 is specifically configured to: for images of pre-selected vehicles with target shooting times later than a target shooting time of the first image: perform a first operation, wherein the first operation comprises: determining whether an i-th reference vehicle will appear in an i-th pre-selected camera according to a head orientation of the i-th reference vehicle, information of an i-th reference camera, and information of the i-th pre-selected camera for shooting an image of the i-th pre-selected vehicle; if yes, acquiring an i-th predicted head orientation of the i-th reference vehicle when appearing in the i-th pre-selected camera, if the i-th predicted head orientation is as same as a head orientation of the i-th pre-selected vehicle, determining the image of the i-th pre-selected vehicle as the second image of the first vehicle; initially, when i=1, a first reference vehicle is the first vehicle, a first reference camera is the first camera, a target shooting time of the image of the i-th reference vehicle is earlier than a target shooting time of the image of the i-th pre-selected vehicle and has a shortest distance from the target shooting time of the image of the i-th pre-selected vehicle; perform a second operation, wherein the second operation comprises: if there is an image of a pre-selected vehicle with a target shooting time later than the target shooting time of the first image and not traversed, then increasing i by 1, and if the image of the i-th pre-selected vehicle is determined to be the second image, taking the i-th pre-selected vehicle as an (i+1)-th reference vehicle, otherwise taking the i-th reference vehicle as the (i+1)-th reference vehicle; and repeat the first operation and the second operation until all the images of the pre-selected vehicles with the target shooting times later than the target shooting time of the first image are traversed.

Optionally, the re-identification request further includes a shooting time of the first image, and the processing module 602 is specifically configured to: for images of pre-selected vehicles with target shooting times earlier than a target shooting time of the first image: perform a third operation, wherein the third operation comprises: determining whether a j-th reference vehicle will appear in a j-th pre-selected camera according to a head orientation of the j-th reference vehicle, information of a j-th reference camera, and information of the j-th pre-selected camera for shooting an image of the j-th pre-selected vehicle; if yes, acquiring a j-th predicted head orientation of the j-th reference vehicle when appearing in the j-th pre-selected camera, if the j-th predicted head orientation is as same as a head orientation of the j-th pre-selected vehicle, determining the image of the j-th pre-selected vehicle as the second image of the first vehicle; initially, when j=1, a first reference vehicle is the first vehicle, a first reference camera is the first camera, a target shooting time of the image of the j-th reference vehicle is later than a target shooting time of the image of the j-th pre-selected vehicle and has a shortest distance from the target shooting time of the image of the j-th pre-selected vehicle; perform a fourth operation, wherein the fourth operation comprises: if there is an image of a pre-selected vehicle with a target shooting time earlier than the target shooting time of the first image and not traversed, then increasing j by 1, and if an image of the j-th pre-selected vehicle is determined to be the second image, taking the j-th pre-selected vehicle as a (j+1)-th reference vehicle, otherwise taking the j-th reference vehicle as the (j+1)-th reference vehicle; and repeat the third operation and the fourth operation until all the images of the pre-selected vehicles with the target shooting times earlier than the target shooting time of the first image are traversed.

Optionally, where the first feature is a global feature of the first vehicle, and the processing module 602 is specifically configured to acquire, based on the first image, the global feature of the first vehicle by adopting a second neural network model.

Optionally, where the first feature is a feature after fusion of a global sub-feature and a feature point sub-feature of the first vehicle; the acquiring the first feature of the first vehicle according to the first image includes: acquiring, based on the first image, the global sub-feature of the first vehicle by adopting a second neural network model; acquiring, based on the first image, the feature point sub-feature of the first vehicle by adopting a third neural network model; and fusing the global sub-feature and the feature point sub-feature to obtain the first feature of the first vehicle.

Optionally, where information of a camera includes a geographic location of the camera and a lens orientation of the camera.

The apparatus of the embodiment may be configured to implement the technical solutions of the above method embodiments, and its implementation principles and technical effects are similar, and will not be repeated here.

According to an embodiment of the present application, the present application also provides an electronic device and a readable storage medium.

Figure 7:
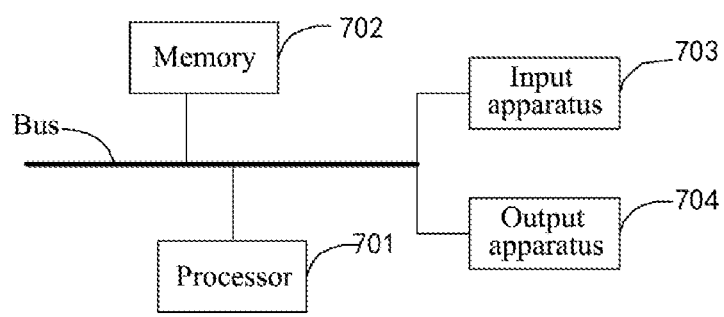
FIG. 7 is a block diagram of an electronic device used for implementing a vehicle re-identification method of an embodiment of the present application.

As shown in FIG. 7, which is a block diagram of an electronic device of a vehicle re-identification method according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or required herein.

As shown in FIG. 7, the electronic device includes: one or more processors 701, a memory 702, and interfaces for connecting various components, including high-speed interfaces and low-speed interfaces. The various components are connected to each other by different buses, and may be installed on a common motherboard or installed in other ways as needed. The processor may process instructions executed in the electronic device, including instructions stored in or on the memory to display graphical information of a GUI on an external input/output apparatus (i.e., a display device coupled to an interface). In other embodiments, multiple processors and/or multiple buses may be used together with multiple memories if necessary. Similarly, multiple electronic devices may be connected, and each device provides some necessary operations (i.e., as a server array, a group of blade servers, or a multi-processor system). A processor 701 is taken as an example in FIG. 7.

The memory 702 is the non-transitory computer-readable storage medium provided by the present application. Where the memory stores instructions that may be executed by at least one processor, so that the at least one processor executes the vehicle re-identification method provided in the present application. The non-transitory computer-readable storage medium of the present application stores computer instructions that cause the computer to execute the vehicle re-identification method provided in the present application.

As a non-transitory computer-readable storage medium, the memory 702 may be used for storing non-transitory software programs, non-transitory computer executable programs, and modules, such as program instructions/modules (i.e., the transceiving module 601 and the processing module 602 shown in FIG. 6) corresponding to the vehicle re-identification method in the embodiment of the present application. The processor 701 executes various functional applications and data processing of the server by running non-transitory software programs, instructions, and modules that are stored in the memory, that is, implements the vehicle re-identification method in the above method embodiments.

The memory 702 may include a program storage area and a data storage area, where the program storage area may store an operating system and an application program required by at least one function; the data storage area may store data generated by the utilization of the terminal device and/or server. Moreover, the memory 702 may include a high-speed random access memory, or a non-transitory memory, such as at least one magnetic disk storage device, a flash memory device, or other non-transitory solid-state storage devices. In some embodiments, the memory 702 may optionally include memories remotely located relative to the processor 701, and these remote memories may be connected to the electronic device for vehicle re-identification through a network. Examples of the above networks include, but are not limited to, the Internet, a corporate intranet, a local area network, a mobile communication network and combinations thereof.

The electronic device for the vehicle re-identification method may further include: an input apparatus 703 and an output apparatus 704. The processor 701, the memory 702, the input apparatus 703, and the output apparatus 704 may be connected by a bus or in other ways. In FIG. 7, the connection by a bus is taken as an example.

The input apparatus 703 can receive input digital or character information, and generate key signal input related to the user settings and function control of the terminal device and/or server, such as touch screen, a keyboard, a mouse, a trackpad, a touchpad, a command stick, one or more mouse buttons, a trackball, a joystick and other input apparatuses. The output apparatus 704 may include a display device, an auxiliary lighting device (such as, LED), a tactile feedback device (such as, a vibration motor), etc. The display device may include, but is not limited to, a liquid crystal display (LCD), a light emitting diode (LED) display, and a plasma display. In some embodiments, the display device may be a touch screen.

Various implementations of the systems and technologies described herein can be implemented in the digital electronic circuit systems, integrated circuit systems, application specific integrated circuits (ASIC), computer hardware, firmware, software, and/or combinations thereof. These various implementations may include: being implemented in one or more computer programs, where the one or more computer programs may be executed and/or interpreted on a programmable system including at least one programmable processor, the programmable processor can be a dedicated or general-purpose programmable processor that can receive data and instructions from the storage system, at least one input apparatus, and at least one output apparatus, and send the data and instructions to the storage system, the at least one input apparatus, and the at least one output apparatus.

These computer programs (also referred to as programs, software, software applications, or codes) include machine instructions for programmable processors, and can be implemented by high-level procedures and/or object-oriented programming languages, and/or assembly/machine language. As used herein, the terms "machine-readable medium" and "computer-readable medium" refer to any computer program product, device, and/or apparatus (such as, magnetic disk, optical disk, memory, programmable logic device (PLD)) used for providing machine instructions and/or data to a programmable processor, including, machine-readable media that receive machine instructions used as machine-readable signals. The term "machine-readable signal" refers to any signal used for providing machine instructions and/or data to the programmable processor.

In order to provide interaction with a user, the system and technology described here can be implemented on a computer, where the computer is equipped with: a display apparatus for displaying information to the user (such as, a CRT (cathode ray tube) or LCD (liquid crystal display) monitor); and a keyboard and a guiding apparatus (such as, a mouse or a trackball) through which the user can provide input to the computer. Other types of apparatuses can also be used for providing interaction with the user; for example, the feedback provided to the user can be any form of sensory feedback (such as, visual feedback, auditory feedback, or tactile feedback); and input from the user can be received in any form (including acoustic input, voice input, or tactile input).

The systems and technologies described here can be implemented in a computing system (such as, data server) that includes a back-end component, or a computing system (such as, an application server) that includes a middleware component, or a computing system (such as, a user computer with a graphical user interface or a web browser through which the user can interact with the implementation of the system and technology described herein) that includes a front-end component, or a computing system that includes any combination of such background components, middleware components, or front-end components and any combination thereof. The components of the system can be connected to each other through digital data communication in any form or medium (e.g., communication network). Examples of communication networks include: a local area network (LAN), a wide area network (WAN), and the Internet.

The computer system may include a client (on-board terminal) and a cloud server. The client and the cloud server are generally far away from each other and usually interact through a communication network. The relationship between the client and the cloud server is generated by running computer programs with client-cloud server relationship on the corresponding computers.

The vehicle re-identification method in the embodiment considers not only a feature of a vehicle, but also a head orientation of the vehicle in an image and information of a camera that shot the image, a predicted head orientation of the vehicle in an image of the vehicle shot by an adjacent camera may be predicted according to the head orientation of the vehicle in the image and the information of the camera that shot the image, so that images shot by the adjacent cameras with similar features but with head orientations different from the predicted head orientation may be filtered out. Therefore, the method of the embodiment may reduce the probability of recognizing the image of a vehicle similar in appearance to the vehicle to be re-identified as the vehicle to be re-identified, and improve the accuracy of vehicle re-identification.

In the description of the present application, it should be understood that the orientation or positional relationship indicated by terms "upper", "lower", "front", "rear", "left", "right", "vertical", "horizontal", "top", "bottom", "inner", and "outer" are based on the orientation or positional relationship shown in the drawings, and are only for the convenience of describing the present application and simplifying the description, rather than indicating or implying devices or elements must have a specific orientation, be constructed and operated in a specific orientation, and therefore may not be understood as a limitation of the present application.

It should be understood that the various forms of processes shown above may be reordered, added or deleted steps. For example, the steps described in the present application may be performed in parallel, sequentially, or in a different order, as long as the desired result of the technical solution disclosed in the present application may be achieved, which is not limited herein.

The above specific implementations do not constitute a limitation on the scope of protection of the present application. Those skilled in the art should understand that various modifications, combinations, sub-combinations and substitutions can be made according to design requirements and other factors. Any modifications, equivalent substitutions and improvements made within the spirit and principles of the present disclosure shall fall into the scope of protection of the present application.

What is claimed is:

1. A vehicle re-identification method, comprising:
receiving a re-identification request from a terminal device, the re-identification request comprising a first image of a first vehicle shot by a first camera and information of the first camera;

acquiring a first feature of the first vehicle and a first head orientation of the first vehicle according to the first image;

determining a second image of the first vehicle from images of multiple vehicles according to the first feature, multiple second features extracted based on the images of the multiple vehicles in an image database, the first head orientation of the first vehicle, and the information of the first camera; and transmitting the second image to the terminal device, wherein the determining a second image of the first vehicle from images of multiple vehicles comprises:

determining images of pre-selected vehicles from the images of the multiple vehicles according to the first feature, the multiple second features extracted based on the images of the multiple vehicles, wherein a similarity between a second feature extracted based on an image of a pre-selected vehicle and the first feature is greater than or equal to a preset similarity; and determining the second image of the first vehicle from the images of the pre-selected vehicles according to head orientations of the pre-selected vehicles, the first head orientation, the information of the first camera, and information of a camera for shooting the images of the pre-selected vehicles, wherein the re-identification request further comprises a shooting time of the first image, the determining the second image of the first vehicle from the images of the pre-selected vehicles comprises: for images of pre-selected vehicles with target shooting times later than a target shooting time of the first image:

performing a first operation, wherein the first operation comprises: determining whether an i-th reference vehicle will appear in an i-th pre-selected camera according to a head orientation of the i-th reference vehicle, information of an i-th reference camera, and information of the i-th pre-selected camera for shooting an image of the i-th pre-selected vehicle; if yes, acquiring an i-th predicted head orientation of the i-th reference vehicle when appearing in the i-th pre-selected camera, if the i-th predicted head orientation is as same as a head orientation of the i-th pre-selected vehicle, determining the image of the i-th pre-selected vehicle as the second image of the first vehicle; initially, when i=1, a first reference vehicle is the first vehicle, a first reference camera is the first camera, a target shooting time of the image of the i-th reference vehicle is earlier than a target shooting time of the image of the i-th pre-selected vehicle and has a shortest distance from the target shooting time of the image of the i-th pre-selected vehicle.

2. The method according to claim 1, wherein the re-identification request comprises multiple frames of first images of the first vehicle shot by the first camera; the acquiring a first head orientation of the first vehicle according to the first image comprises:

for each frame of first image, acquiring a head orientation of the first vehicle in the first image according to the first image; and acquiring the first head orientation of the first vehicle according to the head orientations of the first vehicle in respective first images.

3. The method according to claim 2, wherein the acquiring a head orientation of the first vehicle in the first image comprises:

acquiring, based on the first image, the head orientation of the first vehicle in the first image by adopting a first neural network model.

4. The method according to claim 1, wherein the determining the second image of the first vehicle from the images of the pre-selected vehicles further comprises: for images of pre-selected vehicles with target shooting times later than a target shooting time of the first image:

performing a second operation, wherein the second operation comprises: if there is an image of a pre-selected vehicle with a target shooting time later than the target shooting time of the first image and not traversed, then increasing i by 1, and if the image of the i-th pre-selected vehicle is determined to be the second image, taking the i-th pre-selected vehicle as an (i+1)-th reference vehicle, otherwise taking the i-th reference vehicle as the (i+1)-th reference vehicle; and repeating the first operation and the second operation until all the images of the pre-selected vehicles with the target shooting times later than the target shooting time of the first image are traversed.

5. The method according to claim 1, wherein the re-identification request further comprises a shooting time of the first image, the determining the second image of the first vehicle from the images of the pre-selected vehicles comprises: for images of pre-selected vehicles with target shooting times earlier than a target shooting time of the first image:

performing a third operation, wherein the third operation comprises: determining whether a j-th reference vehicle will appear in a j-th pre-selected camera according to a head orientation of the j-th reference vehicle, information of a j-th reference camera, and information of the j-th pre-selected camera for shooting an image of the j-th pre-selected vehicle; if yes, acquiring a j-th predicted head orientation of the j-th reference vehicle when appearing in the j-th pre-selected camera, if the j-th predicted head orientation is as same as a head orientation of the j-th pre-selected vehicle, determining the image of the j-th pre-selected vehicle as the second image of the first vehicle; initially, when j=1, a first reference vehicle is the first vehicle, a first reference camera is the first camera, a target shooting time of the image of the j-th reference vehicle is later than a target shooting time of the image of the j-th pre-selected vehicle and has a shortest distance from the target shooting time of the image of the j-th pre-selected vehicle;

performing a fourth operation, wherein the fourth operation comprises: if there is an image of a pre-selected vehicle with a target shooting time earlier than the target shooting time of the first image and not traversed, then increasing j by 1, and if an image of the j-th pre-selected vehicle is determined to be the second image, taking the j-th pre-selected vehicle as a (j+1)-th reference vehicle, otherwise taking the j-th reference vehicle as the (j+1)-th reference vehicle; and repeating the third operation and the fourth operation until all the images of the pre-selected vehicles with the target shooting times earlier than the target shooting time of the first image are traversed.

6. The method according to claim 1, wherein the first feature of the first vehicle is a global feature of the first vehicle, the acquiring a first feature of the first vehicle according to the first image comprises:

acquiring, based on the first image, the global feature of the first vehicle by adopting a second neural network model.

7. The method according to claim 1, wherein the first feature is a feature after fusion of a global sub-feature and a feature point sub-feature of the first vehicle; the acquiring the first feature of the first vehicle according to the first image comprises:
acquiring, based on the first image, the global sub-feature of the first vehicle by adopting a second neural network model;
acquiring, based on the first image, the feature point sub-feature of the first vehicle by adopting a third neural network model; and
fusing the global sub-feature and the feature point sub-feature to obtain the first feature of the first vehicle.

8. The method according to claim 1, wherein information of a camera comprises a geographic location of the camera and a lens orientation of the camera.

9. A vehicle re-identification apparatus, comprising
at least one processor; and
a memory communicatively connected with the at least one processor; wherein,
the memory stores instructions executable by the at least one processor, the instructions are executed by the at least one processor to cause the at least one processor to:
receive a re-identification request from a terminal device, the re-identification request comprising a first image of a first vehicle shot by a first camera and information of the first camera;
acquire a first feature of the first vehicle and a first head orientation of the first vehicle according to the first image;
determine a second image of the first vehicle from images of multiple vehicles according to the first feature, multiple second features extracted based on the images of the multiple vehicles in an image database, the first head orientation of the first vehicle, and the information of the first camera; and
transmit the second image to the terminal device,
wherein the instructions are executed by the at least one processor to cause the at least one processor to:
determine images of pre-selected vehicles from the images of the multiple vehicles according to the first feature, the multiple second features extracted based on the images of the multiple vehicles; wherein a similarity between a second feature extracted based on an image of a pre-selected vehicle and the first feature is greater than or equal to a preset similarity; and
determine the second image of the first vehicle from the images of the pre-selected vehicles according to head orientations of the pre-selected vehicles, the first head orientation, the information of the first camera, and information of a camera for shooting the images of the pre-selected vehicles,
wherein the re-identification request further comprises a shooting time of the first image, the instructions are executed by the at least one processor to cause the at least one processor to: for images of pre-selected vehicles with target shooting times later than a target shooting time of the first image:
perform a first operation, wherein the first operation comprises: determining whether an i-th reference vehicle will appear in an i-th pre-selected camera according to a head orientation of the i-th reference vehicle, information of an i-th reference camera, and information of the i-th pre-selected camera for shooting an image of the i-th pre-selected vehicle; if yes, acquiring an i-th predicted head orientation of the i-th reference vehicle when appearing in the i-th pre-selected camera, if the i-th predicted head orientation is as same as a head orientation of the i-th pre-selected vehicle, determining the image of the i-th pre-selected vehicle as the second image of the first vehicle; initially, when i=1, a first reference vehicle is the first vehicle, a first reference camera is the first camera, a target shooting time of the image of the i-th reference vehicle is earlier than a target shooting time of the image of the i-th pre-selected vehicle and has a shortest distance from the target shooting time of the image of the i-th pre-selected vehicle.

10. The apparatus according to claim 9, wherein the re-identification request comprises multiple frames of first images of the first vehicle shot by the first camera; the instructions are executed by the at least one processor to cause the at least one processor to:
for each frame of first image, acquire a head orientation of the first vehicle in the first image according to the first image; and
acquire the first head orientation of the first vehicle according to the head orientations of the first vehicle in respective first images.

11. The apparatus according to claim 9, wherein the instructions are executed by the at least one processor to cause the at least one processor to:
acquire, based on the first image, the head orientation of the first vehicle in the first image by adopting a first neural network model.

12. The apparatus according to claim 9, wherein the instructions are executed by the at least one processor further to cause the at least one processor to: for images of pre-selected vehicles with target shooting times later than a target shooting time of the first image:
perform a second operation, wherein the second operation comprises: if there is an image of a pre-selected vehicle with a target shooting time later than the target shooting time of the first image and not traversed, then increasing i by 1, and if the image of the i-th pre-selected vehicle is determined to be the second image, taking the i-th pre-selected vehicle as an (i+1)-th reference vehicle, otherwise taking the i-th reference vehicle as the (i+1)-th reference vehicle; and
repeat the first operation and the second operation until all the images of the pre-selected vehicles with the target shooting times later than the target shooting time of the first image are traversed.

13. The apparatus according to claim 9, wherein the re-identification request further comprises a shooting time of the first image, and the instructions are executed by the at least one processor to cause the at least one processor to: for images of pre-selected vehicles with target shooting times earlier than a target shooting time of the first image:
perform a third operation, wherein the third operation comprises: determining whether a j-th reference vehicle will appear in a j-th pre-selected camera according to a head orientation of the j-th reference vehicle, information of a j-th reference camera, and information of the j-th pre-selected camera for shooting an image of the j-th pre-selected vehicle; if yes, acquiring a j-th predicted head orientation of the j-th reference vehicle when appearing in the j-th pre-selected camera, if the j-th predicted head orientation is as same as a head orientation of the j-th pre-selected vehicle, determining the image of the j-th pre-selected vehicle as the second image of the first vehicle; initially, when j=1, a first reference vehicle is the first vehicle, a first reference camera is the first camera, a target shooting time of the image of the j-th reference vehicle is later than a target shooting time of the image of the j-th pre-selected vehicle and has a shortest distance from the target shooting time of the image of the j-th pre-selected vehicle;

perform a fourth operation, wherein the fourth operation comprises: if there is an image of a pre-selected vehicle with a target shooting time earlier than the target shooting time of the first image and not traversed, then increasing j by 1, and if an image of the j-th pre-selected vehicle is determined to be the second image, taking the j-th pre-selected vehicle as a (j+1)-th reference vehicle, otherwise taking the j-th reference vehicle as the (j+1)-th reference vehicle; and repeat the third operation and the fourth operation until all the images of the pre-selected vehicles with the target shooting times earlier than the target shooting time of the first image are traversed.

14. The apparatus according to claim 9, wherein the first feature is a global feature of the first vehicle, the instructions are executed by the at least one processor to cause the at least one processor to:

acquire, based on the first image, the global feature of the first vehicle by adopting a second neural network model.

15. The apparatus according to claim 9, wherein the first feature is a feature after fusion of a global sub-feature and a feature point sub-feature of the first vehicle; the instructions are executed by the at least one processor to cause the at least one processor to:

acquire, based on the first image, the global sub-feature of the first vehicle by adopting a second neural network model;

acquire, based on the first image, the feature point sub-feature of the first vehicle by adopting a third neural network model; and fuse the global sub-feature and the feature point sub-feature to obtain the first feature of the first vehicle.

16. The apparatus according to claim 9, wherein information of a camera comprises a geographic location of the camera and a lens orientation of the camera.

17. A non-transitory computer-readable storage medium storing computer instructions, the computer instructions cause the computer to execute the method according to claim 1.

* * * * *